United States Patent [19]
Adrian et al.

[11] Patent Number: 4,729,109
[45] Date of Patent: Mar. 1, 1988

[54] METHOD AND APPARATUS FOR MEASURING THE DISPLACEMENTS OF PARTICLE IMAGES FOR MULTIPLE EXPOSURE VELOCIMETRY

[75] Inventors: Ronald J. Adrian, Champaign, Ill.; Chung-Sheng Yao, Hacienda Heights, Calif.

[73] Assignee: University of Illinois, Urbana, Ill.

[21] Appl. No.: 738,775

[22] Filed: May 29, 1985

[51] Int. Cl.[4] .......................... G01P 5/22; G01P 3/36; G01F 1/00
[52] U.S. Cl. .................................... 364/560; 364/561; 73/861.06; 356/28
[58] Field of Search ...................... 364/560, 561, 565; 73/861.05, 861.06; 356/27, 28

[56] References Cited

U.S. PATENT DOCUMENTS

| | | | |
|---|---|---|---|
| 3,842,252 | 10/1974 | Jakeman et al. | 364/510 X |
| 4,097,158 | 6/1978 | Dehait | 364/560 X |
| 4,285,046 | 8/1981 | Henry | 364/510 X |
| 4,494,213 | 1/1985 | Thompson | 73/861.06 X |
| 4,543,834 | 10/1985 | Hasegawa et al. | 73/861.05 X |
| 4,554,832 | 11/1985 | Hasegawa et al. | 73/861.05 X |
| 4,593,368 | 6/1986 | Fridge et al. | 364/561 X |
| 4,664,513 | 5/1987 | Webb et al. | 73/861.05 X |

FOREIGN PATENT DOCUMENTS

| | | | |
|---|---|---|---|
| 3106530 | 9/1982 | Fed. Rep. of Germany | 73/861.05 |
| 79/01119 | 12/1979 | PCT Int'l Appl. | 73/861.06 |

OTHER PUBLICATIONS

DeCooman et al, "Measurement of the Velocity of Gas Bubbles in Water by a Correlation Method", The Review of Scientific Instruments", vol. 41, No. 6, Jun. 1973, pp. 843-845.

Nord, H., "A New Solution to an Old Flow Measuring Problem", *ISA Transactions*, vol. 20, No. 2, 1981, pp. 11-14.

*Primary Examiner*—Errol A. Krass
*Assistant Examiner*—Joseph L. Dixon
*Attorney, Agent, or Firm*—John F. Ohlandt

[57] ABSTRACT

A hybrid optical/digital method for measuring the displacements of compact images, in particular, particle images recorded on photographic or other recording media in multiple exposure photography. The method compresses the two-dimensional image field of the particles into two one-dimensional line images that are perpendicular to each other. The mean particle displacement between multiple exposures is determined by digitizing the one dimensional images, computing their autocorrelations, and locating the peaks of those autocorrelations. This method is particularly adapted to measure the velocity fields in fluids containing many small particles. Alternatively, when the first and second images of a single particle are the only images in the image field, the displacement is found by locating the peak of each image.

20 Claims, 8 Drawing Figures

METHOD AND APPARATUS FOR MEASURING THE DISPLACEMENTS OF PARTICLE IMAGES FOR MULTIPLE EXPOSURE VELOCIMETRY

The U.S. government has rights in this invention as a result of funding by the National Science Foundation on the Contract NSF-ATM 82-03521.

BACKGROUND OF THE INVENTION

The present invention relates generally to the field of measurement of fluid flow velocity; more particularly, the invention was developed originally for use in a system which measures the velocity of fluid flow by photographing the displacements of fine (micron sized) particles using multiple exposures from a pulsed laser. The background or context from which the invention sprang may therefore be characterized as instrumentation for fluid flow measurement.

More generally, the invention may be said to pertain to any image processing problem in which the displacements of many discrete images are to be measured, including the motion of solids. In the description that follows the invention will be considered primarily in the context of fluid flow measurements.

PRIOR KNOWLEDGE

In pulse laser velocimetry (also called "particle image velocimetry" and "speckle velocimetry") particle images displaced by the motion of a fluid are recorded photographically, videographically, or holographically. The multiple images are typically created by accurately timed pulses of light either from a coherent source (laser) or an incoherent source; and the fluid velocities are inferred from the displacement of the image field between exposures. If the concentration of particles is sufficiently high, the image field consists of so-called speckles. If the concentration is lower, the image field consists of images of individual particles. Typically, the recorded image covers a large region in the fluid, say 100 mm. by 100 mm., and the particle displacements in many small integration spots of the order of 1 mm. in diameter are desired. The interrogation spots may contain many particle images, the problem in determining particle displacement being to determine which image pair constitutes first and second images of the same particle.

A number of techniques that have been previously developed in connection with this problem have often been intended for use in the speckle regime rather than in the particle image regime. The most common approach is to measure the spacing and orientation of the Young's fringes that are formed by diffraction from the correlated pairs of speckles, or pairs of particle images, that reside in the interrogation spot.

In order to provide some background material for a complete understanding of the invention and of the context from which it emerges, reference may be made to the following articles: D. G. Simpkins and T. D. Dudderar, "Laser Speckle Measurement of Transient Benard Convection," J. Fluid Mech. 88, 665 (1978); R. Grousson and S. Mallick, "Study of Flow Pattern in a Fluid by Scattered Laser Light," Appl. Opt. 16, 2334 (1977); D. B. Barker and M. E. Fourney, "Measuring Fluid Velocities with Speckle Patterns," Opt. Lett. 1, 135 (1977); R. Meynart, "Digital Image Processing for Speckle Flow Velocimetry," Rev. Sci. Instrum. 53, 110 (1982).

It is of course well known from the above cited references, as well as others, that the intensity of the two-dimensional Young's fringe pattern can be digitized and analyzed by two-dimensional Fourier analysis to determine the speed and direction of the displacement, and hence the velocity.

Because one of the fundamental difficulties in connection with measurment of the displacement of particle images resides in the extremely long computation time required, several techniques have been proposed to reduce this computation time per interrogation spot. One class of techniques effectively integrates along lines parallel to the aforesaid fringes, and performs a one-dimensional fast Fourier transform and power spectral analysis of the integrated data. However, this faster class of techniques achieves its objectives by mechanically rotating the fringes into alignment with a detector and performs the integration by using, for example, a cylindrical lens as disclosed in the article by G. H. Kaufmann, A. E. Ennos, B. Gales and D. J. Pugh, "An Electro-Optical Read-Out System for Analysis of Speckle Photographs," J. Phys. E, 13, 579 (1980).

Another technique involves performing the integration using a scan line on a two dimensional video array, as disclosed in B. Ineichen, P. Eglin, and R. Dandliker, "Hybrid Optical and Electronic Image Processing for Strain Measurements by Speckle Photography," Appl. Opt. 19, 2191 (1980).

A third technique is a linear array oriented perpendicular to the fringes as disclosed in G. E. Maddux, R. R. Corwin and S. L. Moorman, in Proceedings, Spring Meeting of the Society for Experimental Stress Analysis (1981).

A fundamental drawback of all of the aforesaid techniques is that the mechanical rotation involved is slow. A method to eliminate this mechanical rotation has been proposed; that is, a method in which one-dimensional Fourier transforms are calculated along the rows and columns of a two-dimensional array that has arbitrary orientation with respect to the Young's fringes.

Other methods for measuring the displacement by two-dimensional correlation of the image field within the integration spot have also been suggested, as disclosed for example in W. H. Peters and W. F. Ranson, "Digital Imaging Techniques in Experimental Stress Analysis," Opt. Eng. 21, 427 (1982); R. J. Adrian, in "Flow Visualization and Laser Velocimetry for Wind Tunnels," NASA Conference Publication 2243 (1982), p. 219; and M. Yano, Proceedings, Third International Symposium on Flow Visualization, Sept. 6–9, 1983, Ann Arbor, Mich. (1983), p. 237. A further known method is one in which the histogram of the displacements in two dimensions is constructed, as for example in N. Takai and T. Asakura, "Displacement Measurement of Speckles Using a 2-D Level-Crossing Technique," Appl. Opt. 22, 3514 (1983). Both of these methods are slow because the displacements are usually desired on a finely resolved grid, which is employed to obtain velocity accuracy; this grid may contain as many as $1024 \times 1024$ points.

SUMMARY OF THE INVENTION

The present invention in its broadest aspect seeks to eliminate the drawbacks, problems and difficulties associated with the previously noted known apparatus and methods of measuring particle image displacement.

Accordingly, it is a primary object of the present invention to obtain an efficient technique and apparatus for measuring the displacements of particle images by avoiding the necessity of analyzing, on a two-dimensional basis, a two-dimensional image field of such particles.

Applicants have recognized that by compressing the two dimensional image field of the particles into two one-dimensional line images that are perpendicular to each other, the mean particle displacement between multiple exposures can readily be obtained.

A fundamental feature of the invention therefore resides in the provision of determining the mean particle displacement between multiple exposures by digitizing the one-dimensional images; thence by computing their autocorrelations and by locating the second peak of each autocorrelation the velocity field in fluids containing many particles can be measured. The location of the second correlation peak is proportional to the particle separation.

When the image field contains only the first and second images of one particle, the displacement can be determined by measuring the separation of the peaks of the images. This mode is feasible when the mean number of images in an interrogation spot is small, so that the probability of seeing more than one particle is small. It is simpler than autocorrelation analysis.

In a preferred embodiment the primary feature involves optically forming the compressed images by focusing individual beams that have been split from an image beam onto respective linear diode arrays. Then by measuring the compressed images by means of these linear diode arrays and reading out the resulting diode array voltage signals the particle image displacements may be simply computed. The important advantage of the present invention is that it simplifies the calculations required to determine particle displacement; moreover, it increases the speeds with which spots may be interrogated by reducing the conventionally accepted two-dimensional image analysis to a one dimensional analysis by means of the aforenoted compression of the image information in orthogonal directions using integration.

The intensity distribution in an interrogation spot $I(x,y)$ is replaced by two one-dimensional intensity distributions:

$$I_x(x) = \int I(x,y)dy, \quad I_y(y) = \int I(x,y)dx \qquad (1)$$

where I represents intensity.

It will be appreciated that the integration directions are not necessarily aligned with the image, e.g., image rotation need not be performed. The integrations can be performed by imaging the interrogation spot onto a two-dimensional detector array and integrating along its rows and columns respectively. The optical method described in the preferred embodiment is preferred because it does not require a two-dimensional detector.

The autocorrelations of $I_x$ and $I_y$ are $$R_x(s) = I_x(x) I_x(x+s_x)dx, \quad R_y(s) = I_y(y)I_y(y+s_y)dy \qquad (2)$$

The autocorrelations possess large peaks located at $s_x=0$ and $s_y=0$, and secondary maxima located at $s_x$ = mean image displacement in the x-direction and at $s_y$ = mean image displacement in the y-direction. By means of the already located $s_x$ and $s_y$, the mean image displacements can be measured. When $I_x$ and $I_y$ are digitized, their discrete values are available at $x=n\Delta x$ and $y=n\Delta y$. The discrete forms of the autocorrelations are $$R_x(k) = \sum_{n=1} I_x(n)I_x(n+k) \text{ and } R_y(k) = \sum_{n=1} I_y(n)I_y(n+k). \qquad (3)$$

Other and further objects, advantages and features of the present invention will be understood by reference to the following specification in conjunction with the annexed drawing, wherein like parts have been given like numbers.

DETAILED DESCRIPTION OF PREFERRED EMBODIMENT

Figure 1:
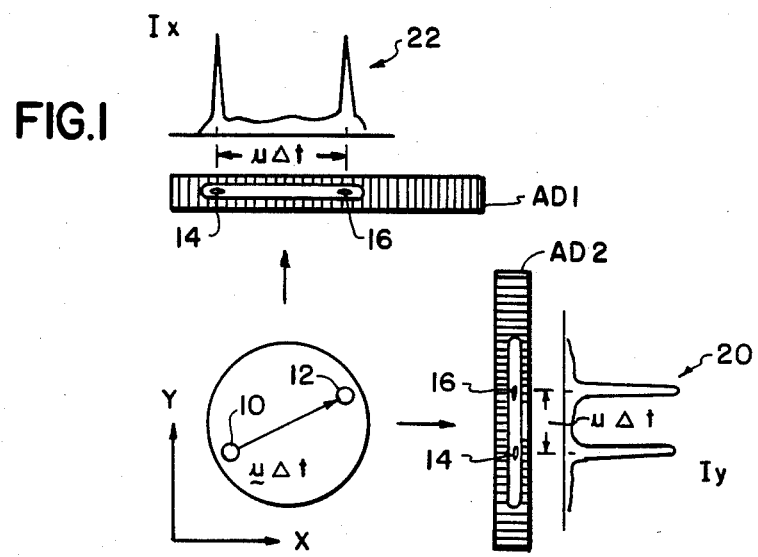
FIG. 1 is a diagramatic showing of the interrogation of a spot involving particle images on a photographic record by means of linear one-dimensional compression in accordance with the present invention.

Referring now to the figures of the drawing and particularly for the moment to FIG. 1, there will be seen a diagrammatic depiction of the principle of the present invention, involving interrogation of a spot on a photographic medium by means of linear one-dimensional compression. The preferred embodiment is one in which the intensity distributions $I_x$ and $I_y$ are formed by using cylindrical lenses to image $I(x,y)$ onto a one-dimensional linear diode array with image compression perpendicular to the array as shown in FIG. 1. Each element of the individual arrays responds to the light flux integrated across its width. Consequently, the scanned outputs of the arrays will represent $I_x$ and $I_y$ when the compressed image width is less than the width of the linear array. The linear arrays shown may contain 64 to 1,024 elements or higher, depending upon the accuracy with which the displacement is to be measured and upon the size of the scattering particles.

In the example shown in FIG. 1 the two circular particle images 10 and 12 are compressed onto the respective linear diode arrays AD1 and AD2, as indicated by the ovals 14 and 16 respectively.

As a consequence of the integrated transformation provided by the respective photodiode arrays, two peaks in each of the resultant electrical signals 20 and 22 result. These are called the $I_x$ and $I_y$ current distributions. The electrical signals 20 and 22 are digitized and subsequently analyzed to obtain the mean displacement of the particle or particles 10 and 12 in the interrogation spot. Analysis may determine displacements by (a) seeking the locations of the peaks of two particle images when there is only one particle image pair in the interrogation spot; or (b) computing the autocorrelation of the one-dimensional image and locating the secondary peak of the autocorrelation, corresponding to the correlation between the first and second images of the particles in the interrogation spot. The displacement can be measured more accurately by computing the centroid of the secondary correlation peak. It can be shown that this corrsponds to the mean displacement of the particles in the interrogation spot. Correlation analysis works with many pairs or just one pair.

Figure 2:
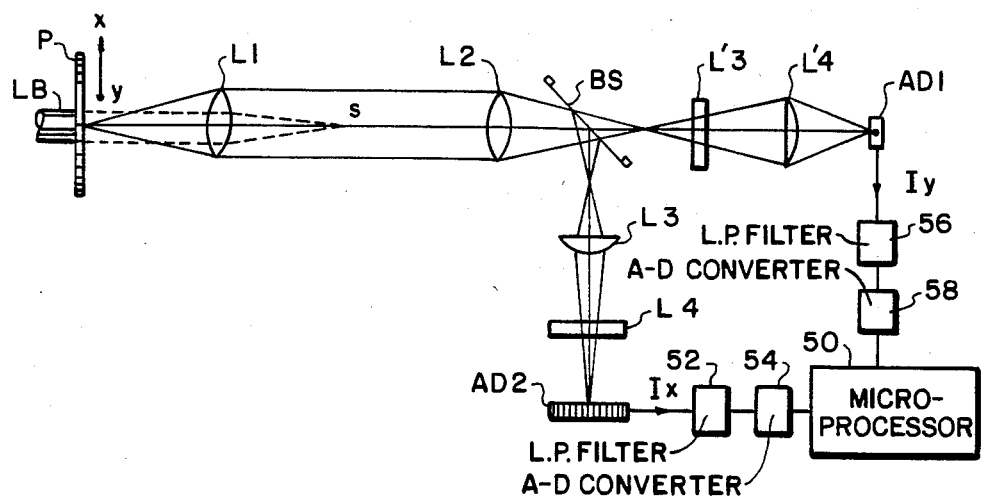
FIG. 2 is a schematic diagram of an optical system in accordance with a preferred embodiment for obtaining orthogonal compression of the interrogation spot.

Turning now to FIG. 2, an optical system that performs the operations described above, that is the operations involving interrogation by linear one-dimensional compression, is shown in this figure. The photographic record P is interrogated by laser beam LB. The image of the interrogation spot is passed through high pass spatial filters L1 and L2 for removing mean illumination, after which the image beam is divided using a beam splitter BS that minimizes secondary reflections.

The resultant images from the beam splitter are directed onto the detectors AD1 and AD2 by cylindrical lenses L3' and L3 respectively. The images are compressed in the Y and X directions by cylindrical lenses L4' and L4 respectively. The cylindrical lens L4' is parallel to the linear array detector AD1 and perpendicular to the cylindrical lens L4, which is parallel to the linear array AD2. As it was noted before, the array outputs $I_x$ and $I_y$ (also called distributions heretofore) are digitized and analyzed in a microprocessor 50 after being passed through a low pass filter 52 and then through an analog to digital converter 54 so as to convert the signals from the linear array to appropriate digital form for processing into the microprocessor 50. Similarly, in the Y direction the analog signals from AD1 are transmitted to a low pass filter 56 and thence to an analog to digital converter 58 before being fed to the microprocessor 50.

Figure 3:
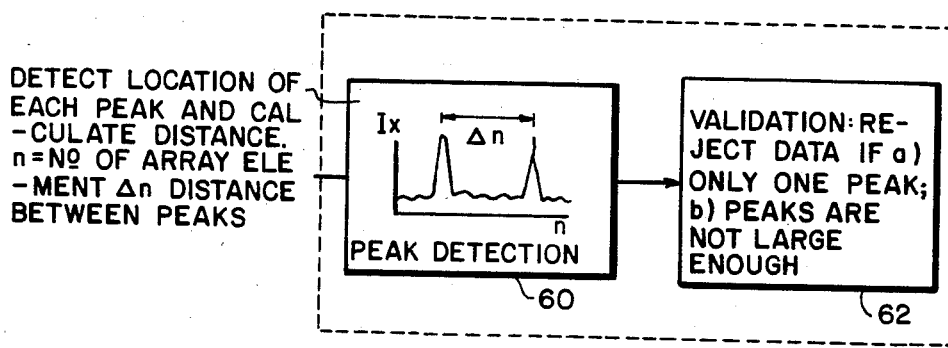
FIG. 3 is a flow chart illustrating the functions performed to analyze $I_x$ and $I_y$ in accordance with a first preferred method.

Referring now to FIG. 3, the particular functions performed within the microprocessor 50 to achieve a complete analysis of the signals $I_x$ and $I_y$ are seen in flow chart form. A well known microprocessor such as the PDP-11/23 could be utilized for this purpose. The separate signals are analyzed so as to detect the location of each peak as indicated in the block 60. In addition to detecting the location of each peak shown, the distance $\Delta n$ is calculated, where n is the number of the $n^{th}$ array element and $\Delta n$ equals the number of elements between peaks. It will be noted that $\Delta x = \Delta n \, d$, where d is the space between photodiodes on the linear array.

A further operation performed within the microprocessor is validation, indicated by block 62; that is, the data is rejected if it is found that there is an odd number of peaks, or the peaks are not large enough in accordance with the predetermined threshold.

A somewhat different alternative method or technique of analysis may be performed as indicated on the block, or flow chart, diagram of FIG. 4. In accordance with this arrangement the microprocessor 50 provides, in the first place, an autocorrelation analysis of $I_x$ (and $I_y$). This operation is designated 64, and has the form, $$R_x(k) = 1/N - k \sum_{n=1}^{N-K} I_x(n) I_x(n + k),$$

where R is the autocorrelation. Also, the peak in the autocorrelation is located, as indicated by block 66; such peak corresponds to the mean displacement of the second images. This method or technique is useful when there are many images in the interrogation spot so that it is difficult to determine which images are pairs.

Further operations performed by the processor 50 are indicated by the blocks 66, 68 (and 70 as an alternate to 68), 72 and 74. The speed with which the microprocessor 50 performs the correlation analysis or the peak search analysis may be enhanced by using a well known array processor board such as the Skymak.

Figure 4A:
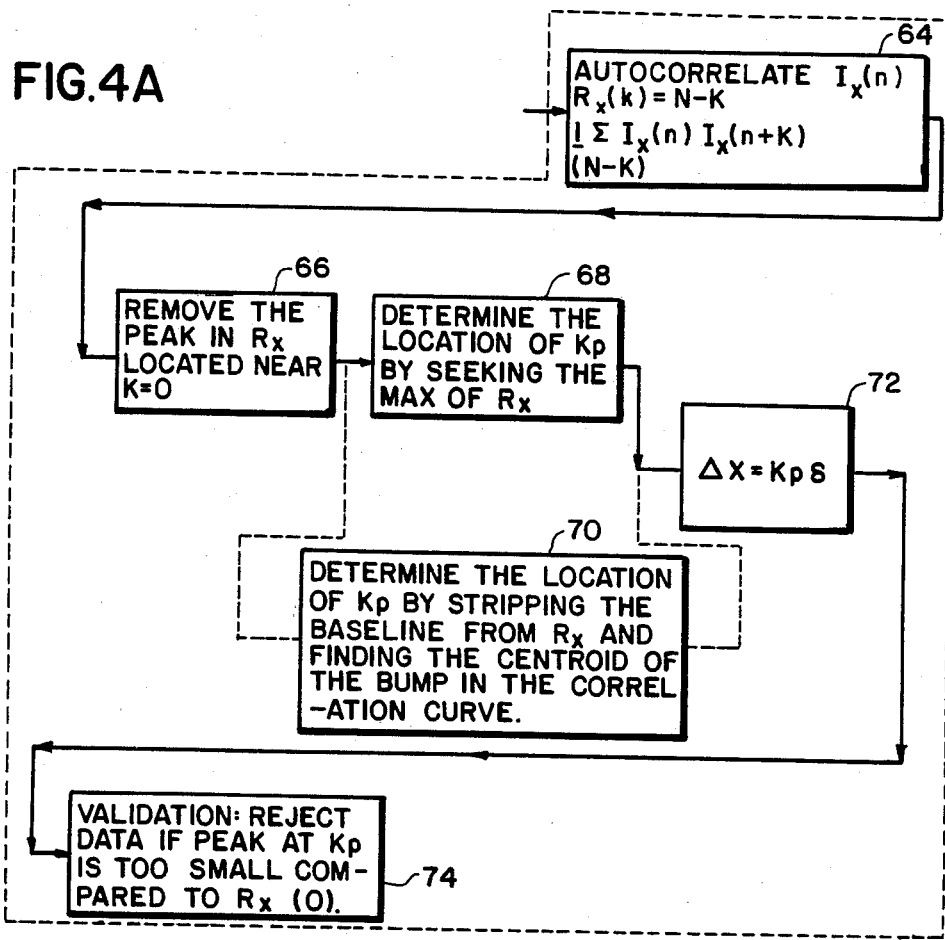
FIG. 4A is another flow chart illustrating a more involved alternate method which includes performing digital autocorrelation analysis of $I_x$ and $I_y$.
Figure 4B:
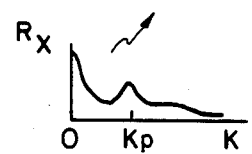
FIGS. 4B, 4C and 4D are curves depicting the relationship between $R_x$ and k in the autocorrelation function.
Figure 4C:
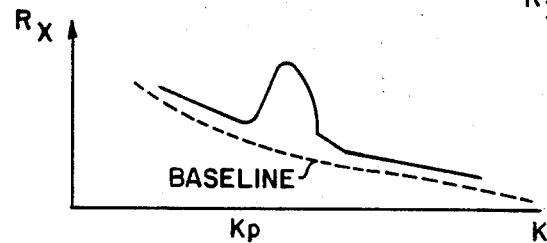

It will be apparent by reference to FIG. 4B that following the autocorrelation step, the peak in $R_x$ located near $K=0$ is removed by the operation designated 66; and then the location of $K_p$ is determined by seeking the maximum of $R_x$ in accordance with operation 68. The subsequent calculation step or operation designated 72 yields $\Delta X$ which is equal to $K_p \times d$, d being the space between photodiodes on the linear array.

Figure 4D:
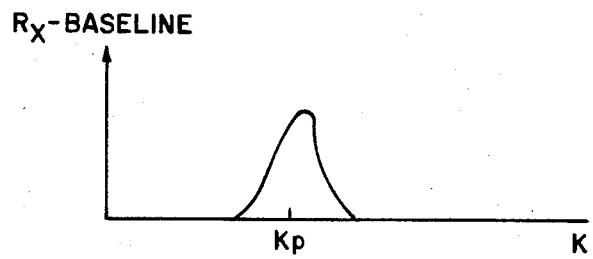

An alternative way, indicated by the operation 70, of determining the location of $K_p$ is by stripping the baseline from $R_x$. The baseline is included in FIG. 4C, whereas the result of stripping is shown in FIG. 4D. The final result is that the centroid of the hump in the correlation curve is found.

Subsequent to the operation 72, the ultimate step of validation is performed, such step or operation being designated 74. The data is rejected if the peak in $K_p$ is too small compared to $R_x(O)$.

Figure 5:
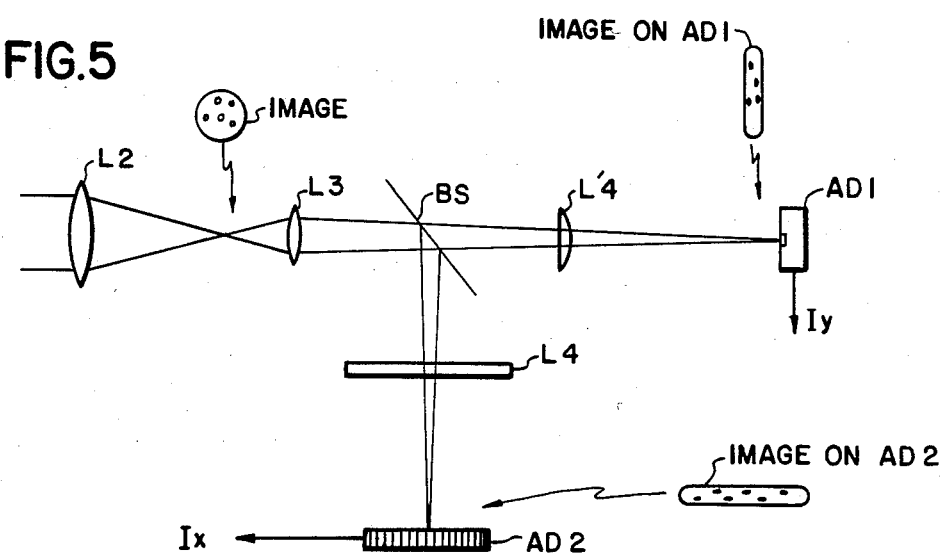
FIG. 5 is an alternate embodiment of a method and apparatus of forming compressed images.

Referring now to FIG. 5, there will be seen an alternate arrangement of an optical system for orthogonal compression of the interrogation spot. This method or system is similar to that previously seen in FIG. 2. However, subsequent to the point at which the particle images are projected by means of the lens L2, which is identical to that seen in FIG. 2, a different scheme is provided. In this arrangement of FIG. 5, a microscope objective or special lens L3 is placed just before the beam splitter BS. The advantage of the use of such spherical lens is that it magnifies the image of the interrogation spot (a circular region); furthermore, it is a less expensive lens than a cylindrical lens.

As a result of the arrangement seen in FIG. 5, the magnified image as seen extends along a 10 millimeter array of diodes in the linear diode array AD2. A similar image appears on AD1. The cylindrical lenses L4 and L4' function to compress the circular interrogation spot image, thereby to produce the indicated elliptical images covering the respective linear arrays.

It will be understood that from the linear arrays AD2 and AD1, the electrical signals $I_x$ and $I_y$ respectively are transmitted and processed in the same manner as already described in connection with FIG. 2.

From all that has been disclosed, it will be apparent to those skilled in the art that the present invention substantially increases the speed with which the collection of particle images in an interrogation spot can be analyzed to determine their mean displacement, and to obtain their velocity. For example, if 1024 elements are used in the X and Y directions respectively, the clear-cut advantage is that the present invention requires the analysis of only 2,048 elements, whereas two-dimensional systems known heretofore, required the analysis of 1024×1024 elements. Consequently, it will be understood that the resultant speed increases involves a factor as large as 512.

While there have been shown and described what are considered at present to be the preferred embodiments of the present invention, it will be appreciated by those skilled in the art that modifications of such embodiments may be made. It is therefore desired that the invention not be limited to these embodiments, and it is intended to cover in the appended claims all such modifications as fall within the true spirit and scope of the invention.

What is claimed is:

1. A method of measuring the displacement of compact images comprising the steps of:
    (a) providing a source of spatially separated compact images, said images having intensity distribution;
    (b) compressing the images in separate, one-dimensional X and Y directions, including integrating the image intensity in said X and Y directions to produce respective electrical signals;
    (c) analyzing the electrical signals resulting from the separate one dimensional compressions to determine the X and Y image displacements respectively.

2. A method as defined in claim 1, in which said step of integrating the image intensity in X and Y directions is performed by selecting an interrogation spot containing particle images, and imaging said spot onto X and Y linear detector arrays.

3. A method of measuring the displacement of compact images comprising the steps of:
    (a) periodically illuminating a record medium containing said images with a light beam;
    (b) splitting the images into two individual images along the X and Y directions respectively;
    (c) forming compressed images by projecting the individual images onto respective linear diode arrays;
    (d) measuring the compressed images using integration by linear detector arrays to yield resulting detector array output signals; and
    (e) analyzing the resulting detector array output signals to determine the X and Y image displacements respectively.

4. A method as defined in claim 3, in which the compact images are particle images.

5. A method as defined in claim 4, further comprising the step of providing a spatial filter to remove background light.

6. A method as defined in claim 3, including, before step (a) thereof, the steps of:
    removing noise from said output signals;
    converting the output signals, which are initially in analog form, to digital signals; and
    transmitting the digital signals to a microprocessor.

7. A method as defined in claim 6, further comprising the steps thereafter of detecting the location of each peak in the output digital signals, and calculating the distance between peaks.

8. A method as defined in claim 7, including the further step of validation by rejecting the data if there is only one peak or the peaks are not large enough.

9. A method as defined in claim 6, comprising the further step of:
    autocorrelating the digital signals $I_x$ and $I_y$ so obtained, and locating the peak in the autocorrelation corresponding to the mean displacement of first and second images;
    determining the location of $K_p$ by seeking the maximum of $R_x$ and $R_y$, where $K_p$ equals the location of the peak in the secondary maximum of $R_x$, and for determining $\Delta x$ by multiplying $K_p \times d$ where d is the spacing between the photodiodes on the linear detector array.

10. A method as defined in claim 9, further comprising:
    removing the peak in the correlated signals located near $K=0$, where K equals the delay index of the autocorrelation.

11. A system of measuring the displacement of compact images comprising:
    (a) means for providing a source of spatially separated compact images, said images having intensity distribution;
    (b) means for compressing the images in separate, one-dimensional X and Y directions, including means for integrating the image intensity in said X and Y directions to produce respective electrical signals; and
    (c) means for analyzing the electrical signals resulting from the separate one-dimensional compressions to determine the X and Y image displacements respectively.

12. A system as defined in claim 11, in which said means for integrating the image intensity in X and Y directions includes means for selecting an interrogation spot containing particle images, and for imaging said spot onto X and Y linear detector arrays.

13. A system of measuring the displacement of compact images comprising:
    (a) means for periodically illuminating a record medium containing said images with a light beam;
    (b) means for splitting the images into two individual images along the X and Y directions respectively;
    (c) means for forming compressed images by projecting the individual images onto respective linear diode arrays;
    (d) means for measuring the compressed images using integration by said linear detector arrays to yield resulting detector array output signals; and
    (e) means for reading the resulting detector array output signals.

14. A system as defined in claim 13, in which the compact images are particle images.

15. A system as defined in claim 14, further comprising a spatial filter for removing background light, said filter being located between said record medium and said means for splitting the images.

16. A system as defined in claim 13 further comprising:
    means for removing noise from said output signals:
    means for converting the output signals, from which noise has been removed and which are initially in analog form, to digital signals; and
    means for transmitting the digital signals to a microprocessor.

17. A system as defined in claim 16, further comprising means for detecting the location of each peak in the output digital signals, and for calculating the distance between peaks.

18. A system as defined in claim 17, further including validation means for rejecting the data if there is only one peak or the peaks are not large enough.

19. A system as defined in claim 16, further comprising:
    means for autocorrelating the digital signals $I_x$ and $I_y$ so obtained and locating the peak in the autocorrelation corresponding to the means displacement of first and second images;
    means for determining the location of $K_p$ by seeking the maximum of $R_x$ and $R_y$, where $K_p$ equals the location of the peak in the secondary maximum of $R_x$, and for determining $\Delta X$ by multiplying $K_p$ times d, where d is the spacing between the photodiodes on the linear detector array.

20. A system as defined in claim 19, further comprising means for removing the peak in the correlated signals located near $K=0$, where K equals the delay index of the autocorrelation.

* * * * *

UNITED STATES PATENT AND TRADEMARK OFFICE
CERTIFICATE OF CORRECTION

PATENT NO. : 4,729,109
DATED : March 1, 1988
INVENTOR(S) : Ronald I. Adrian, Chung-Sheng Yao It is certified that error appears in the above-identified patent and that said Letters Patent are hereby corrected as shown below:

Column 3, line 47, "I" should read --$\bar{I}$--.

Signed and Sealed this

Eighth Day of November, 1988

Attest:

DONALD J. QUIGG

Attesting Officer     Commissioner of Patents and Trademarks